United States Patent [19]
Robins

[11] 3,925,894
[45] Dec. 16, 1975

[54] DUAL PURPOSE TOOTH ALIGNER

[76] Inventor: Lenford L. Robins, 244 Fieldstone Terrace, Riverdale, Bronx, N.Y. 10471

[22] Filed: Aug. 8, 1974

[21] Appl. No.: 495,582

Related U.S. Application Data

[63] Continuation-in-part of Ser. No. 429,073, Dec. 28, 1973, Pat. No. 3,849,885.

[52] U.S. Cl. ................................................. 32/14 B
[51] Int. Cl.² .......................................... A61C 7/00
[58] Field of Search ........................................ 32/14

[56] References Cited
UNITED STATES PATENTS

| | | | |
|---|---|---|---|
| 646,629 | 4/1900 | Sugatt | 32/14 B |
| 3,724,075 | 3/1971 | Kesling | 32/14 B |

FOREIGN PATENTS OR APPLICATIONS

| | | | |
|---|---|---|---|
| 831,743 | 2/1952 | Germany | 32/14 E |

Primary Examiner—Robert Peshock
Attorney, Agent, or Firm—Lerner, David, Littenberg & Samuel

[57] ABSTRACT

An improved tooth aligner for aligning teeth in both a first and second row of teeth is disclosed, comprising a pair of arcuate tooth-aligning members, preferably composed of plastic, and spaced apart so as to permit the insertion of the first row of teeth therebetween. The improved tooth aligner disclosed includes a wire support member joining the pair of tooth-aligning members into a predetermined tooth-aligning orientation, wherein the wire support member includes an arcuate forward portion and a pair of support arms extending from the ends thereof to thereby join the pair of tooth-aligning members. Furthermore, means are provided associated with the forward tooth-aligning member to urge the second row of teeth into proper alignment. In this manner only a single such device is required in order to properly align teeth in both the first and second upper and lower rows of teeth.

19 Claims, 8 Drawing Figures

U.S. Patent Dec. 16, 1975 3,925,894

DUAL PURPOSE TOOTH ALIGNER

CROSS REFERENCE TO RELATED APPLICATIONS

This application is a continuation-in-part of Ser. No. 429,073, filed Dec. 28, 1973 in the name of Lenford L. Robins, the inventor herein, now U.S. Pat. No. 3,849,885 issued Nov. 26, 1974.

FIELD OF THE INVENTION

The present invention is concerned with improved teeth aligners. Specifically, this invention is concerned with such tooth aligners for use by dentists and orthodontists in properly aligning rows of teeth, such as by rotating the individual teeth therein. More particularly, the present invention is concerned with a highly portable and easily prepared tooth aligner for such use in properly aligning or straightening rows of teeth whose individual teeth are crooked or out of proper alignment. Still more particularly, the present invention is concerned with a single tooth aligner which is effective for producing the proper alignment of teeth contained in both an upper and lower row of teeth.

BACKGROUND OF THE INVENTION

In the prior art, when a dentist or orthodontist desired to realign a row or rows of teeth which were out of proper alignment, it was necessary to employ complex and cumbersome devices, which required lengthy and difficult procedures in order to be properly prepared. Furthermore, it was also often necessary to employ complicated wires and band devices, which are also quite uncomfortable to the user, or other devices which may only be employed for intermittent periods, such as when the user is asleep. And most significantly, those devices which could be employed continuously, had to be separately prepared for each row of teeth for which teeth were to be properly realigned.

For example, U.S. Pat. No. 2,479,780 discloses a rubber orthodontic applicance for realigning teeth, including an appliance fitted between the upper and lower jaw, and conforming to one such row of teeth. Furthermore, the appliance is prepared so that during home use by the patient it is inserted in the mouth and, in biting, one face of any teeth to be moved engages the surface of the device. Thus, during each bite by the patient, pressure is applied to the tooth in question, tending to move it into a desired spacial relationship. Therefore, such a device may only be employed intermittently by the patient, and is effective only during such biting or pressure applied by him. Furthermore, the patient may not carry out any of his normal activities, such as conversation, eating, etc., while employing this device.

In another such tooth regulating device, U.S. Pat. No. 646,629 discloses a device which avoids the use of ligatures or bands, and includes an elastic plate of vulcanized rubber so constructed so as to press against the improperly aligned teeth in order to rotate and straighten same. As described by the patentee, however, this device requires the preparation of a new plate every few days, in order to continuously apply pressure to the teeth.

Furthermore, the tooth positioning and retaining device taught in U.S. Pat. No. 3,478,429 includes a flexible plastic mouthpiece having upper and lower generally arcuate grooves to assist in the orientation of teeth while the user is sleeping, etc. Thus, this device also does not permit the user to continue correcting the alignment of his teeth during his normal activities, but he must maintain his mouth in a closed position in order to receive any benefits therefrom.

In view of these deficiencies of the prior art devices, applicant has provided a highly improved tooth-aligning device, as disclosed in Ser. No. 429,073, which issued as U.S. Pat. No. 3,849,885, on Nov. 26, 1974 which is easily and inexpensively prepared, is highly portable, and may be continuously used by the patient, while not requiring the continuous preparation of new devices to obtain proper tooth alignment. This device has been eminently successful in providing continuous constant pressure to realign a row of teeth disposed therein, while being highly portable, easily prepared, and not interferring with the patient's normal activities. It is, however, necessary for the wearer to employ one of these devices for each row of teeth which requires realignment. It has therefore been desired to produce a single such device which may be applied to a row of teeth, be it upper or lower, and at the same time effect the realignment of the other row of teeth, without the preparation of another such device therefor.

It is therefore an object of the present invention to provide an improved tooth aligner which overcomes the difficulties of the prior art devices.

It is a further object of the present invention to provide an improved tooth aligner which can effect the realignment of teeth in more than one row of teeth, and further which is highly portable, easily removable by the patient, and which may be used continuously without interferring with the patient's normal activities.

It is yet another object of the present invention to provide such an improved tooth aligner which is capable of imparting constant and continuous pressure to realign teeth in more than one improperly aligned row of teeth.

SUMMARY OF THE INVENTION

In accordance with the present invention, an improved tooth aligner is provided, including substantially arcuate first and second tooth-aligning members, said tooth-aligning members spaced apart so as to permit the insertion of a row of teeth therebetween. Furthermore, the present tooth aligner includes a wire support member joining said first tooth-aligning member to said second tooth-aligning member into a predetermined tooth-aligning orientation, such that one of the improperly aligned rows of teeth, to which the improved tooth aligner is to be applied, may be forced into a proper alignment. The improperly aligned rows of teeth may each thus include one or more teeth which are out of alignment with the remainder of the row of teeth, or which requires rotation into proper alignment therefrom. The wire support member itself includes a substantially arcuate forward portion which cooperates with the first tooth-aligning member, and a pair of support arms extending from the ends of the substantially arcuate forward portion to the second tooth-aligning member, again so as to join the first tooth-aligning member to the second tooth-aligning member into a predetermined tooth-aligning orientation. Furthermore, the first tooth-aligning member includes means for urging the teeth in a second row of teeth, to which the improved tooth aligner is not applied, into the proper alignment. In this manner, it is possible to properly align teeth in two rows of teeth, that is the upper and lower teeth, while only a single tooth aligner, associated with one such row of teeth, is employed. Also, in this manner substantially continuous and constant pressure for realigning the unaligned teeth in the row of teeth upon which the tooth aligner is disposed is provided, while at the same time such pressure is also applied to the other row of teeth not associated with the tooth aligner, whenever one jaw is closed and the two rows of teeth are brought into occlusion.

Where this improved tooth aligner is thus to be employed in association with a lower row of teeth, and for the realignment of the forward teeth of a row of lower teeth, as well as the forward teeth of the row of upper teeth, it will be prepared in the manner such that the pair of support arms of the wire support member will be positioned distal to the cuspids, that is between the cuspids and the first bicuspids, in order to obtain a firm anchorage for the tooth aligner. Similarly, where the tooth aligner is to be applied to an upper row of teeth, for the realignment of the forward teeth of the row of upper teeth as well as the forward teeth of the row of lower teeth, it is prepared so that the support arms are positioned distal to the first bicuspid, or between the first bicuspid and the second bicuspid.

In a preferred embodiment of the present invention, the first tooth-aligning member is adapted to urge the teeth in a second row of teeth into proper alignment. The first tooth-aligning member may thus include a built-up portion along its outer surface in order to rotate improperly aligned teeth in the row of teeth with which the tooth aligner is not associated. In addition, this may also be accomplished by providing a bridge portion connecting the first and second tooth-aligning members, and including a built-up outer portion prepared in a manner so as to impart the desired degree of pressure to move or rotate an improperly aligned tooth in the row of teeth which is not associated with the tooth aligner into the desired proper alignment. In addition, in this embodiment, the inner area of this bridge portion will be adapted to accept the individual teeth therein and, at the same time, urge them into the proper or desired orientation. Thus in this case, where there is a bridge portion joining the first and second tooth-aligning members, additional means are provided, such as a coil or spring, for urging the teeth disposed therebetween towards the first or forward tooth-aligning member. It is most preferred, however, that the bridge portion not completely join the first and second tooth-aligning members, or that there be a space therebetween, so that the desired urging of the teeth disposed therebetween be urged into the desired orientation by the pressure produced by the wire support member, as described in Ser. No. 429,073.

In a preferred embodiment of the present invention, the wire support member will also include a coiled portion disposed intermediate of the ends of said substantially arcuate portion, for maintaining the first tooth-aligning member in its prescribed arcuate configuration. In addition, the pair of support arms which extend from the ends of the substantially arcuate forward portion of the wire support member are disposed at acute angles with respect to said forward portion of the wire support member. That is, these support arms are preferably disposed at angles of less than ninety degrees. In this manner, it is possible to maintain the pair of support arms and the forward portion of the wire support member in their predetermined alignment with respect to each other and, therefore, to dissipate any force applied thereto tending to separate the pair of support arms from the arcuate forward portion of the wire support member, so as to thereby increase the angle therebetween. The tendency for the pair of support arms to be separated from the arcuate forward portion of the wire support member, that is, for the angle therebetween to be increased, is occasioned by the natural forces applied to the first and second tooth-aligning members during use, and as the tooth-aligning members are applying the required forces against the unaligned row of teeth. By thus maintaining the acute angle between the pair of support arms and the forward portion of the wire support member, it is again possible to employ the single improved tooth aligner of the present invention, without replacement, to obtain rapid realignment of a row of teeth.

In another highly preferred embodiment of the present invention, the first tooth-aligning member will include two tooth-retaining portions, and the aforesaid coiled portion of the forward portion of the wire support member will be disposed therebetween. In this manner, the maximum advantage obtainable by the use of the coiled portion, and the retention of the substantially arcuate shape of said forward portion obtainable thereby is obtained.

In yet another highly preferred embodiment of the present invention, the ends of the first tooth-aligning member will extend beyond the point where the support arms extend from the forward portion of the wire support member, and in a manner so as to grip the next succeeding tooth, preferably the first bicuspid where a row of lower teeth is to be aligned and the second bicuspid where a row of upper teeth is to be aligned. The ends of the first tooth-aligning member will thus include paris of tooth-gripping fingers for this purpose.

DETAILED DESCRIPTION

Figure 1:
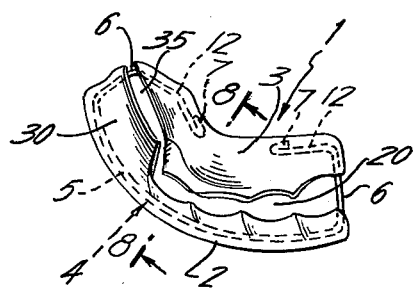
FIG. 1 is a plan view of the improved tooth aligner of the present invention.

Referring to the figures, in which like numerals refer to like parts thereof, FIG. 1 shows the improved tooth aligner of the present invention, generally designated 1, including a pair of tooth-aligning members, 2 and 3. The first, or forward, tooth-aligning member 2, and the second, or rearward, tooth-aligning member 3 are maintained in a spaced apart relationship, so that a row of teeth may be inserted in the space 20 therebetween.

Figure 4:
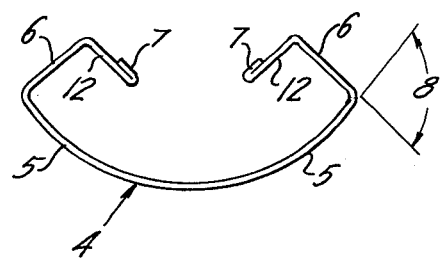
FIG. 4 is a top perspective view of wire support member of the improved tooth aligner of the present invention.

This is accomplished by the use of wire support member, generally designated 4 in FIG. 4, which thus joins the first and second tooth-aligning members 2 and 3. The wire support member, as specifically shown in FIG. 4, includes a substantially arcuate forward portion 5, which cooperates with the first tooth-aligning member 2, and a pair of support arms 6, which join said first tooth aligning member 2 to the second tooth-aligning member 3. The support arms themselves are substantially L-shaped and include an elbow portion 12 thereon, terminating in a substantially U-shaped bend 7. Thus, the substantially arcuate forward portion 5 of the wire support member 4 may either be attached to or embedded in the first tooth-aligning member 2. The forward portion 5 of the wire support member 4 and the first tooth-aligning member 2 will thus have substantially coextensive arcuate shapes. Further, the pair of support arms 6 are attached to or embedded in the second tooth-aligning member 3.

In this manner, the first and second tooth-aligning members are maintained in a predetermined tooth-aligning orientation, with one of the improperly aligned rows of teeth disposed therebetween. The first tooth aligning member 2 also includes contours, or built-up portions 30, thereon, which are in a predetermined configuration, which will be discussed below, and which therefore act to realign teeth in the other row of teeth which is not associated with the improved tooth aligner. This is accomplished by applying pressure to predetermined portions of the unaligned teeth in that second row of teeth whenever the mouth is closed, and the teeth come into contact with this outer surface of the first tooth aligning member 2.

Figure 2:
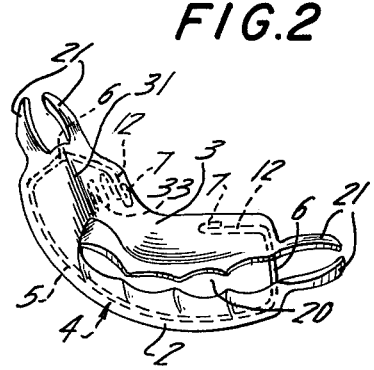
FIG. 2 is a plan view of another embodiment of the improved tooth aligner of the present invention.

Preferably, the pair of support arms 6 are disposed at an acute angle 8 with respect to the forward portion 5 of the wire support member 4, as shown in FIG. 2. This acute angle 8, i.e., less than 90° thus provides for the maintenance of the pair of support arms 6 of the forward portion 5 of the wire support member 4 in their determined alignment with respect to each other, and the prevention of any increase in this angle, or the separation of the pair of support arms 6 from the forward portion 5 of the wire support member 4, as forces are applied thereto during normal use. These forces generally result from the pressure exerted between the improperly aligned teeth and the first and second tooth-aligning members during use, as will be discussed in more detail below. The retention of the predetermined orientation or alignment between the pair of support arms 6 and the forward portion 5 of the wire support member 4 thus provides for constant and continuous application of pressure from the pair of tooth-aligning members 2 and 3 to the improperly aligned teeth.

Figure 3:
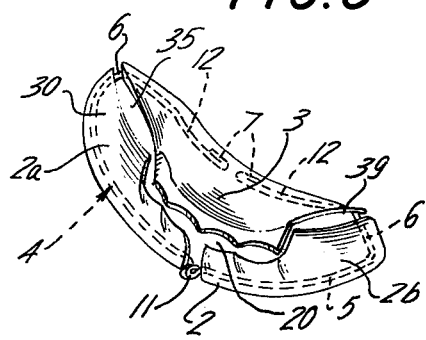
FIG. 3 is a top perspective view of another embodiment of the improved tooth-aligner of the present invention.

Referring to FIG. 3, the first tooth-aligning member 2 may also include two tooth-retaining portions designated 2a and 2b, respectively. These tooth-retaining portions may be entirely separate, or may include a narrow bridge portion connecting same. Furthermore, the improved tooth aligner of the present invention may also include, upon the wire support member 4, a coiled portion 11 disposed intermediate of the ends of the substantially arcuate forward portion 5 thereof, so as to maintain the first tooth-aligning member in its prescribed arcuate configuration. As was disclosed in Ser. No. 429,073, the inclusion of such a coiled portion 11 upon the forward portion 5 of the wire support member 4 is highly effective in applying a constant and continuous pressure from the first and second tooth-aligning members 2 and 3 to the improperly aligned tooth or teeth. By using the present improved tooth aligner it is therefore possible to maintain these forces substantially constant and obtain the proper realignment of the teeth disposed between the first and second tooth-aligning members, as well as the teeth in the row of teeth not disposed between the first and second tooth-aligning members, in a short period of time, and with the necessity for readjusting or replacing the tooth aligner. This is again particularly true where the first tooth-aligning member 2 includes two tooth-retaining members, 2a and 2b, and in which case further bias is imparted thereto, so that the first tooth aligning member retains its substantially arcuate shape. Further, since the means carried by the first tooth aligning member 2, including contours 30, are pre-oriented in the manner to be described below to realign teeth in the row of teeth not associated with the tooth aligner, this retention of the original shape of the improved tooth aligner also assists in the realignment of the other row of teeth in a substantially shorter period of time, and with constant pressure applied to these unaligned teeth each time that the two rows of teeth are brought together.

Figure 8:
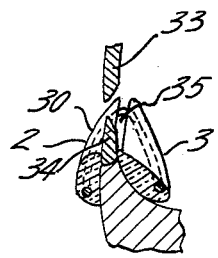
FIG. 8 is a partial side view of the improved tooth aligner of the present invention disposed on a lower tooth, taken along line 8—8 of FIG. 7, in conjunction with an upper tooth.

As can best be seen in FIG. 8, the realignment of an improperly aligned tooth 33 in an upper row of teeth is accomplished while the improved tooth aligner 1 is disposed over a row of lower teeth, including improperly aligned tooth 34 thereof. Each time the teeth are brought together, the upper tooth 33 comes into contact with the contoured portion 30 of the first tooth aligning member 2, and since the contoured portion 30 is pre-set into a predetermined orientation, as discussed below, the proper re-orientation of the upper tooth 33 is accomplished, along with the orientation of the lower tooth 34, as discussed herein. This eventually results in movement or rotation of upper tooth 33 into the desired position as shown in the plan top view in FIG. 8.

In the embodiment of the present invention shown in FIG. 2, the built-up or contoured portion 30 is included on an entire bridge portion 31 which actually joins the first and second tooth-aligning members 2 and 3, and again is composed of the same plastic or acrylic material of which they are composed. Thus, in this embodiment, while the upper teeth which are to be realigned will be urged into their desired positions by the pressure imparted by this bridge portion 31, just as with the built-up portion 30 of the improved tooth aligner of FIG. 1, the lower teeth covered by the bridge portion 31 will not be disposed between two independant tooth-aligning members. In order to therefore obtain the realignment of these teeth, it is necessary to include a coil or spring member 33 cooperating with the second tooth-aligning member 3. This coil 33 will thus be embedded in the second tooth-aligning member 3 at one end, at a position behind the tooth which is to be realigned, but which is disposed beneath the bridge portion 31, and will be so placed so as to press against a selected face of the rear portion of that tooth at its other end. This is necessary in this case because there is insufficient bias between the two tooth-aligning members 2 and 3 here, which normally occurs in view of their separation, as at 35 in FIGS. 1, 3 and 8, and the action of the wire support member 4 is substantially alleviated due to the connection between the two tooth-aligning members effected by bridge member 31.

Figure 7:
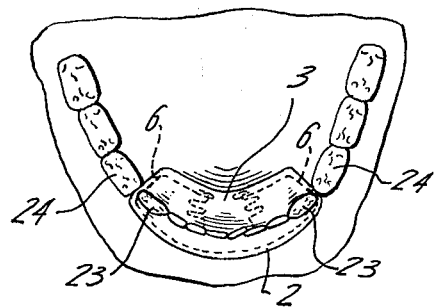
FIG. 7 is a top perspective view of a row of teeth with an improved tooth aligner of the present invention disposed thereon.

Furthermore, it is preferred that the pair of support arms 6 extend between particular teeth, depending upon whether the tooth aligner is to be disposed upon a row of upper or lower teeth. The purpose of this is to obtain the firmest possible anchorage of the tooth aligner upon that particular row of teeth. Thus, as shown in FIG. 7, where the tooth aligner is disposed upon a row of lower teeth the pair of support arms 6 will pass distal to the cuspids 23, or between the cuspids 23 and first bicuspids 24. Similarly, where the tooth aligner is disposed upon a row of upper teeth, the pair of support arms 6 will pass distal to the first bicuspids, or between the first bicuspids and second bicuspids.

The first tooth aligning member 2 may also include a pair of tooth-gripping fingers 21, as shown in FIG. 2, extending from the ends thereof. These tooth-gripping fingers 21 will thus be comprised of the same material as the tooth aligning members, that is preferably plastic or acrylics, and will substantially surround the next succeeding tooth disposed beyond the point where the support arms 6 join the first and second tooth-aligning members. Therefore, as discussed above, these fingers 21 will preferably grip the first and second bicuspids where the tooth aligner is disposed on a row of lower and upper teeth, respectively. Aside from providing firmer anchorage for the tooth aligner, these tooth-gripping fingers 21 also improve the strength of the tooth aligner, and prevent the ends or corners of the wire support member 4 from wearing through the tooth-aligning members.

Figure 5:
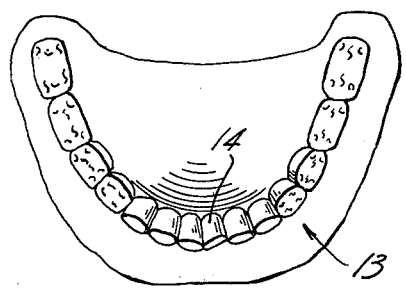
FIG. 5 is an elevational perspective view of a row of teeth, including an improperly aligned tooth therein.
Figure 6:
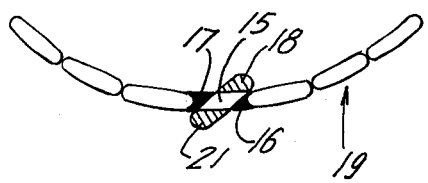
FIG. 6 is a top perspective view of a row of teeth, including an unaligned tooth therein.

The improved tooth aligner of the present invention may be prepared in the following manner. Initially, an impression is taken of a row of teeth, designated 13 in FIG. 5, including one or more improperly aligned teeth 14 thereon. This impression material such as an alginate, which is inserted, in paste form, into the patient's mouth on a dental tray or mold. As seen in FIG. 5, it is thus desired to rotate the improperly aligned tooth 14 in the row of upper or lower teeth 13 into a proper relationship with the remaining teeth thereof. This impression thus duplicates the row of improperly aligned teeth 13. Further preparation of the improved tooth aligner of the present invention may be better understood with reference to FIG. 6. A mold or duplicate of a portion of a row of teeth, including at least one improperly aligned tooth 15 thereon, is thus shown. This mold or duplicate is prepared from the initial dental impression by various well known procedures, such as by pouring up the impression with a dental stone material or Plaster of Paris, which hardens into the duplicate of the row of teeth, as seen in FIG. 5. Wax is then added to this plaster mold of the improperly aligned tooth 15, as shown in FIG. 6, on the portions of each side thereof into which position the tooth is to be realigned. Thus, with respect to improperly aligned or rotated tooth 15, wax is built up on the side of the forward portion thereof, 16, and on the portion of the rear side thereof, 17, in the direction into which the tooth is to be rotated. Furthermore, plaster is scraped or removed from the plaster mold of the improperly aligned tooth 15 at the portions thereof 18 and 21, from which the improperly aligned tooth is to be rotated. Thus, as shown by the cross-hatching in FIG. 6, plaster is scraped from the rear portion 18 and from the forward portion 21 of the improperly aligned tooth 15, which are to be vacated upon the proper rotation of the improperly aligned tooth 15 into its desired alignment with the remainder of the row of teeth 19. Upon completion of this procedure, the mold will correspond with the row of teeth within its preferred or desired alignment, that is, after the completion of the tooth-aligning process. The tooth aligner of the present invention, and specifically the inner shapes of the first and second tooth-aligning members 2 and 3 thereof, are thus prepared from this thus-treated plaster mold, now including built-up wax portions thereon. Preferably, the first and second tooth-aligning members 2 and 3 will be prepared from plastic, most preferably arcylics. The plastic is thus poured onto the mold, and the wire support member 4, in its preferred configuration described above, is set thereon prior to hardening of the previously heat-softened plastic. Thus, upon hardening, the first and second tooth-aligning members will be of a shape such that a portion thereof will apply significant pressure to those portions of the front and rear sides of the improperly aligned tooth 14 which are to be rotated into a desired alignment with the remaining teeth. Furthermore, their alignment will be facilitated by the presence of hollow or void spaces upon the first and second tooth aligning members into which the improperly aligned tooth is to be rotated. These hollow spaces are a result of the presence of added wax on the portions 16 and 17 of the improperly aligned tooth 15, as described above. No plastic will therefore flow into these locations during preparation of the improved tooth aligner of the present invention.

In the preferred method of preparing the present improved tooth aligner, a second impression is taken of the other row of teeth, substantially in the same manner described above with respect to the row of teeth with which the improved tooth aligner is to be associated. Again, a mold or duplicate of this row of teeth is again prepared by the same above-noted procedures. Thus, after the tooth aligner is prepared in the manner described above, and the plastic or acrylic material is poured over the mold of teeth and hardens, the mold corresponding to the other row of teeth is brought into occlusion with respect to the row of teeth 13, now including the improved tooth aligner of the present invention disposed thereon, just as would be the situation in the patient's mouth. With respect to a particular tooth, such as tooth 33 shown in FIG. 8, contained in that second mold, and with respect to which tooth it is desired to move or rotate same, a built-up portion 30 may now be added to the first tooth aligning member 2, so that each time the patient's mouth closes that tooth 33 will come into contact with the built-up portion 30 and be realigned into the position shown in phantom view in FIG. 8. While preferably this procedure will leave a space 35 between the first and second tooth aligning members 2 and 3, so that all of the above-noted discussion regarding realignment of the teeth, such as tooth 34, in the row of teeth with which the improved tooth aligner is associated will not be lost, this procedure is also applicable to that situation where the mold is prepared in the manner described with respect to FIG. 2, and a bridge portion 31 now completely joins the first and second tooth aligning members 2 and 3, and in which a coil 33 is thus required in order to accomplish the desired movement or rotation of tooth 34 within the bridge portion 31. In this manner realignment of a tooth 34 in lower row of teeth, as well as a tooth 33 in an upper row of teeth may be simultaneously accomplished by the use of a single tooth aligner associated with the row of lower teeth including tooth 34.

It is also noted that an altered, and somewhat preferred method of finally preparing the present improved tooth aligner subsequent to the above-described process for building up wax and scraping plaster from the plaster mold of the initial row of improperly aligned teeth, 13, the wire support member 4 will be set upon the plaster mold prior to the pouring of the material from which the first and second tooth-aligning members 2 and 3, respectively, are to be prepared, preferably acrylics. The final stages in preparing such a tooth aligner, that is prior to establishment of the built up portion 30, is accomplished by the pouring of plastic to surround each tooth, up to a point approximately midway of the height of each tooth, so that upon setting the row of teeth may be inserted in the space formed therebetween. Furthermore, extra plastic may again be poured and molded about the next succeeding teeth following the pair of support arms 6, as described above, in order to prepare the tooth-gripping fingers 21. After hardening, and after inclusion of additional built-up portions 30, as desired, in order to effect realignment of teeth 34 in the upper row of teeth not associated with the improved tooth aligner, the tooth aligner may thus be removed, and be ready for use by the patient.

The invention may be embodied in other specific forms without departing from the spirit or essential characteristics thereof. The present embodiment is, therefore, to be considered in all respects as illustrative and not restrictive, the scope of the invention being indicated by the appended claims rather than by the foregoing description and all changes which come within the meaning and range of equivalency of the claims are, therefore, intended to be embraced therein.

What I claim is:

1. An improved tooth aligner for aligning teeth in both a first and second row of teeth, comprising,
    substantially arcuate first and second tooth-aligning members, spaced apart to permit the insertion of said first row of teeth therebetween,
    wire support means joining said first tooth-aligning member to said second tooth-aligning member into a predetermined tooth-aligning orientation, said wire support means including a substantially arcuate forward portion cooperating with said first tooth-aligning member and a pair of support arms extending from the ends of said forward portion to said second tooth-aligning member to thereby properly align teeth disposed between said first and said second tooth-aligning members, and
    means associated with said first tooth-aligning member to urge the teeth in said second row of teeth into proper alignment, without employing any means continuously associated with said second row of teeth.

2. The improved tooth aligner of claim 1 wherein said means associated with said first tooth-aligning member comprises a built-up portion carried by said second tooth-aligning member to guide the teeth in said second row of teeth into their proper alignment.

3. The improved tooth aligner of claim 1 wherein said wire support means includes a coiled portion disposed intermediate of the said ends of said forward portion for maintaining said first tooth-aligning member in its prescribed arcuate configuration.

4. The improved tooth aligner of claim 1 wherein said support arms are disposed at acute angles with respect to said forward portion of said wire support means, to thereby maintain said support arms in said forward portion of said wire support means in their predetermined alignment, and to dissipate any force applied thereto tending to separate said support arms from said forward portion of said wire support means.

5. The improved tooth aligner of claim 1 wherein said first and second tooth-aligning members comprise plastic.

6. The improved tooth aligner of claim 1 wherein said first tooth-aligning member comprises two tooth-retaining portions, with said coiled portion disposed therebetween.

7. The improved tooth aligner of claim 1 wherein said first tooth-retaining member includes a pair of tooth-gripping fingers extending from the ends thereof.

8. The improved tooth aligner of claim 1 wherein said support arms are substantially L-shaped.

9. An improved tooth aligner for aligning teeth in both a first and second row of teeth, comprising,
    substantially arcuate first and second tooth-aligning members, spaced apart to permit the insertion of said first row of teeth therebetween, said first tooth-aligning member being adapted to urge said teeth in said second row of teeth into proper alignment, without employing any means continuously associated with said second row of teeth, and
    wire support means joining said first tooth-aligning member to said second tooth-aligning member, into a predetermined tooth-aligning orientation, said wire support means including a substantially arcuate forward portion cooperating with said first tooth-aligning member and a pair of support arms extending from the ends of said forward portion to said second tooth-aligning member, to thereby properly align teeth in said first row of teeth disposed between said first and second tooth-aligning members.

10. The improved tooth aligner of claim 9 wherein said wire support means includes a coiled portion disposed intermediate of said ends of said forward portion for maintaining said first tooth-aligning member in its prescribed arcuate configuration.

11. The improved tooth aligner of claim 9 wherein said support arms are disposed at acute angles with respect to said forward portion of said wire support means, to therby maintain said support arms and said forward portion of said wire support means in their predetermined alignment, and to dissipate forces applied thereto tending to separate said support arms from said forward portion of said wire support means.

12. The improved tooth aligner of claim 9 wherein said first and second tooth-aligning members comprise plastic.

13. The improved tooth aligner of claim 9 wherein said first tooth-aligning member comprises two tooth retaining portions, with said coiled portion disposed therebetween.

14. The improved tooth aligner of claim 9 wherein said first tooth-retaining member includes a pair of tooth-gripping fingers extending from the ends thereof.

15. The improved tooth aligner of claim 9 wherein said first tooth-aligning member includes convex portions thereon to urge the teeth in said second row of teeth into proper alignment when said two rows of teeth are brought together.

16. The improved tooth aligner of claim 9 wherein said first tooth-retaining member includes a pair of tooth-gripping fingers extending from the ends thereof.

17. The improved tooth aligner of claim 9 wherein said support arms are substantially L-shaped.

18. The improved tooth aligner of claim 9 wherein said first tooth aligning member is adapted to urge said teeth in said second row of teeth into proper alignment by bridge means joining said first and second tooth-aligning members, said bridge means including a built-up portion thereon for engagement with said second row of teeth.

19. The improved tooth aligner of claim 18 including bias means associated with said second tooth-aligning member to urge the teeth in said first row of teeth into said proper alignment.

* * * * *